United States Patent [19]

Watanabe

[11] Patent Number: 5,270,841
[45] Date of Patent: Dec. 14, 1993

[54] IMAGE READING APPARATUS

[75] Inventor: Junji Watanabe, Yokohama, Japan

[73] Assignee: Kabushiki Kaisha Toshiba, Kawasaki, Japan

[21] Appl. No.: 843,416

[22] Filed: Feb. 27, 1992

[30] Foreign Application Priority Data

Mar. 30, 1991 [JP] Japan ................................ 3093733

[51] Int. Cl.⁵ .............................................. H04N 1/40
[52] U.S. Cl. .................... 358/496; 358/498; 358/296; 358/474; 355/318
[58] Field of Search ............... 358/496, 498, 296, 474, 358/471, 487, 493, 401; 355/320, 318, 308; 250/223 R, 239

[56] References Cited

U.S. PATENT DOCUMENTS

| | | | |
|---|---|---|---|
| 4,018,985 | 4/1977 | Alden et al. ........................ | 358/474 |
| 4,777,533 | 10/1988 | Watanabe ............................ | 358/296 |
| 4,928,151 | 5/1990 | Saeki .................................. | 355/320 |
| 5,074,537 | 12/1991 | Van Rijn ............................. | 355/320 |
| 5,101,282 | 3/1992 | Honma ............................... | 358/474 |
| 5,139,351 | 8/1992 | Kamada ............................. | 358/296 |

FOREIGN PATENT DOCUMENTS 2-299365  12/1990  Japan ........................... H04N/1/00

*Primary Examiner*—Edward L. Coles, Sr.
*Assistant Examiner*—Fan Lee
*Attorney, Agent, or Firm*—Limbach & Limbach

[57] ABSTRACT

An image reading apparatus includes a casing having inlet and outlet openings which are formed in a front side wall of the casing. An image reading section is arranged in the casing near a rear side wall of the casing. Originals inserted into the casing through the inlet opening are fed by a feeding mechanism to the reading section one by one while being turned by a guide in the casing. The originals passed through the reading section are discharged out of the casing through the outlet opening by a discharging mechanism.

6 Claims, 6 Drawing Sheets

IMAGE READING APPARATUS

BACKGROUND OF THE INVENTION

1. Field of the Invention

The present invention relates to an image reading apparatus used as a facsimile and the like.

2. Description of the Related Art

As shown in Published Unexamined Japanese Patent Application No. 2-299365, for example, an image reading apparatus of this kind usually includes a substantially rectangular casing in which an original reading section is housed, and an original supply tray extending obliquely and upward from the rear side of the casing. Originals set on the original supply tray are fed one by one into the casing through the rear side of the casing, read at the reading section and then discharged outside the casing through the front side of the casing.

In the image reading apparatus having the above-mentioned structure, however, vertical and horizontal dimensions of the whole apparatus become large because of the original supply tray extending back- and upward from the rear side of the casing. Therefore, the apparatus needs a large space when it is to be placed on a desk, for example.

When the apparatus is to be housed on a shelf, for example, while being left unused, a large space is also needed on the shelf because the apparatus has an irregular shape and a large size.

SUMMARY OF THE INVENTION

The present invention is contrived in consideration of the above circumstances and its object is to provide a thin and compact image reading apparatus which is thinner in thickness and more compact in size and requires no large setting and storing space.

In order to achieve this object, an image reading apparatus according to the present invention includes a substantially rectangular flat casing which is provided with a pair of sides opposed to each other. An inlet and outlet openings for originals are formed in one of these paired sides of the casing. In the casing are arranged means for reading images on an original and means for feeding originals, which are inserted into the casing through the inlet opening, to the outlet opening through the reading means.

According to the image reading apparatus having the above-described arrangement, the originals inserted into the casing through the inlet opening which is formed in one side of the casing are read by the reading means and then discharged outside the casing through the outlet opening which is formed in the same side of the casing. Since the inlet and the outlet openings are formed in the same side of the casing, the conventional original supply tray which extends obliquely and upward from the casing can be omitted and the whole of the apparatus can be thus made thinner in thickness and more compact in size like a book. Therefore, the apparatus can be housed together with document files in the drawer of a desk, for example, and also carried by hand. Further, it is not necessary to provide any space which was needed in the case of the conventional apparatus apparatuses because of their original supply tray projecting outside their casing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 through 6 show an image reading apparatus according to an embodiment of the present invention, in which:

FIG. 1 is a perspective view of the apparatus,

FIG. 2 is a sectional view taken along a line II—II in FIG. 1,

FIG. 3 is a perspective view of the apparatus in a state wherein an original supply tray pulled out of the apparatus, FIG. 4 is a sectional view taken along a line IV—IV in FIG. 3, FIG. 5 is a sectional view, similar to FIG. 4, showing the apparatus in a state wherein originals are placed on the paper supply tray, and FIG. 6 is a sectional view, similar to FIG. 4, showing the apparatus in a state wherein part of the originals are read and discharged from the apparatus;

DETAILED DESCRIPTION OF THE PREFERRED EMBODIMENTS

An embodiment wherein an image reading apparatus according to the present invention is applied to a facsimile will be described in detail with reference to the accompanying drawings.

Figure 1:
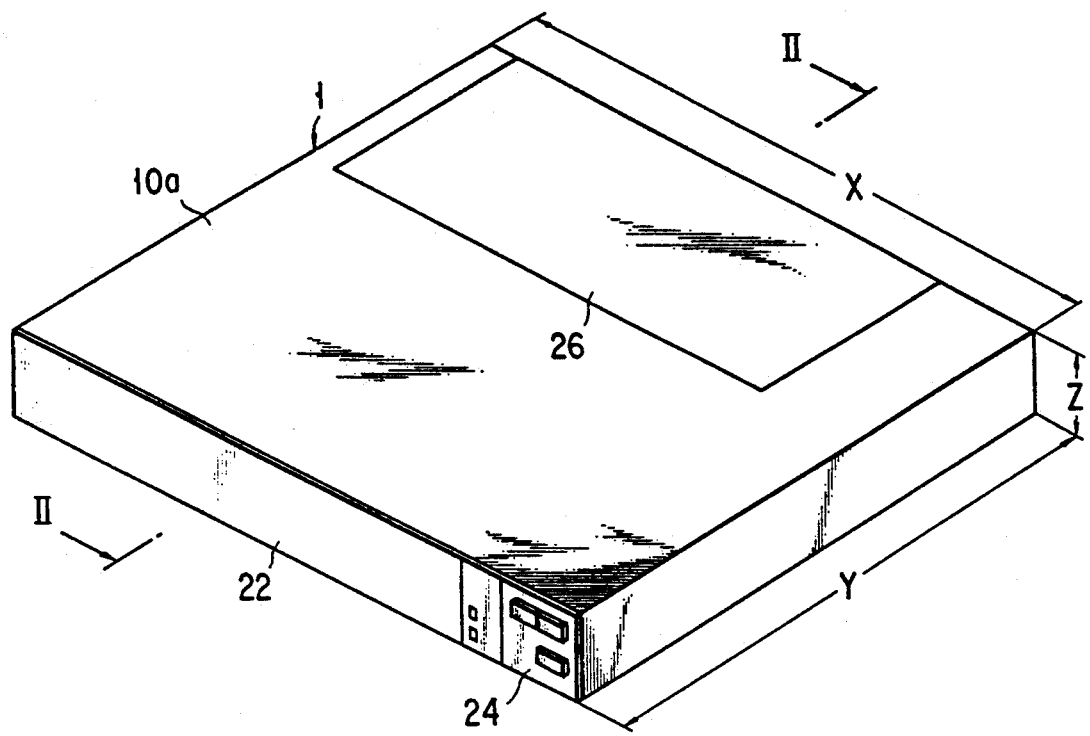
Figure 2:
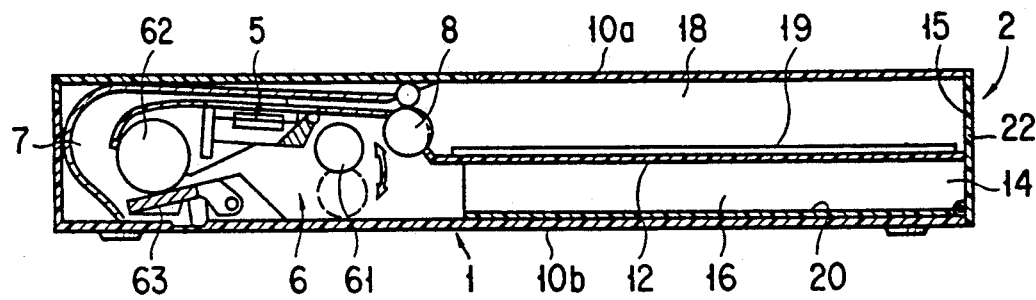

As shown in FIGS. 1 and 2, the facsimile includes a book-like or flat rectangular casing 1, and the height Z of the casing is sufficiently smaller than the width X and depth Y thereof.

Figure 3:
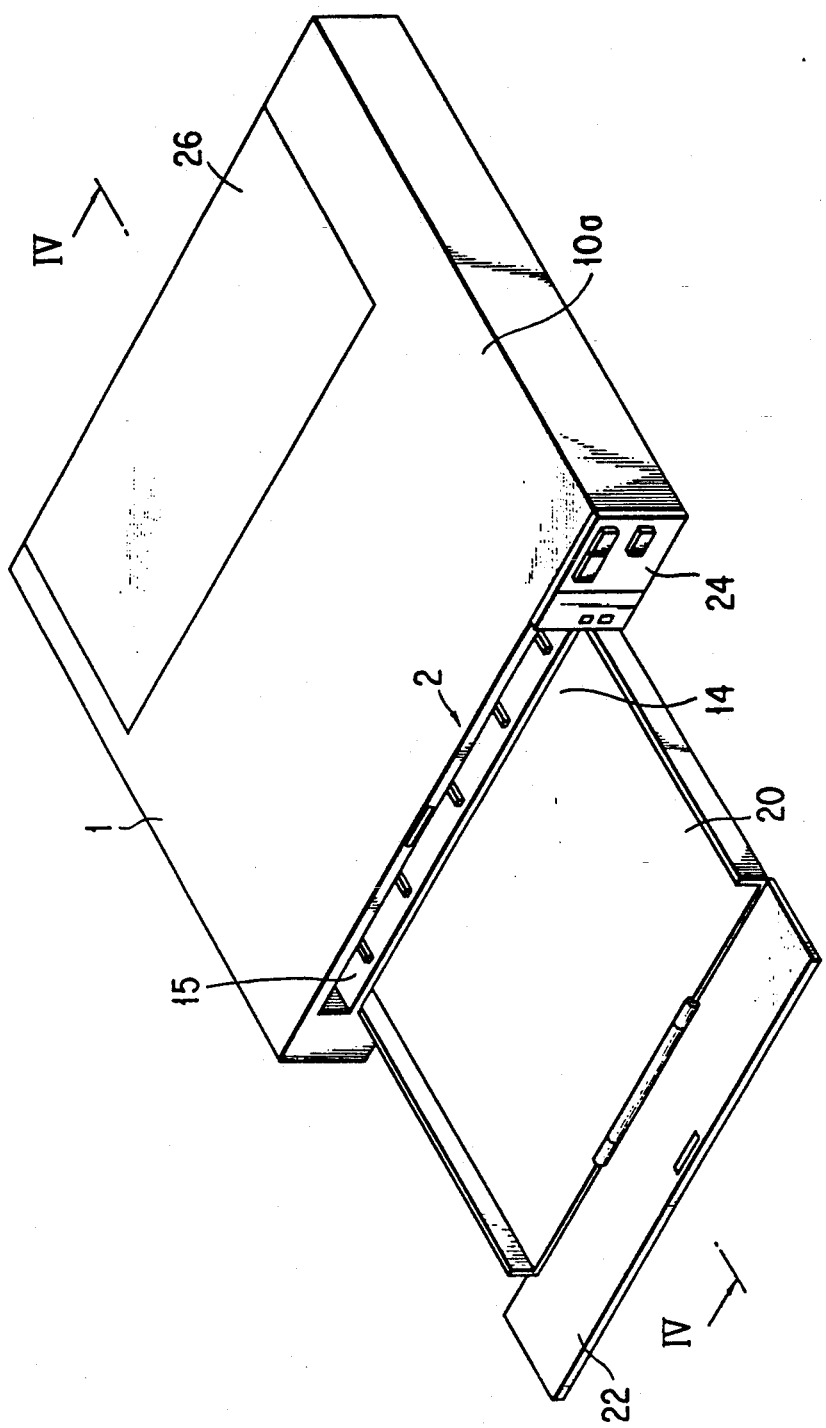

As shown in FIGS. 2 and 3, the casing 1 has an opening 2 at its front side wall and this opening 2 extends substantially all over the front side wall of the casing 1 except for the right end portion of the front side wall. A partition plate 12 is arranged between a top wall 10a and a bottom wall 10b in the casing 1 and extends from the front side wall to the substantially half of the casing 1 in parallel to the bottom wall 10b. The opening 2 is thus divided into an inlet opening 14 through which originals D are inserted into the casing 1, and an outlet opening 15 located above the inlet opening 14 and through which originals D are discharged outside the casing 1. In the casing 1, an original storage section 16 is defined between the bottom wall 10b and the partition plate 12 and communicates with the inlet opening 14, while an original discharge section 18 is defined between the top wall 10a and the partition plate 12 and communicates with the outlet 15.

A plurality of ribs 19 are formed on the upper surface of the partition plate 12, extending in the depth direction of the casing 1. As will be described later, the partition plate 12 serves as an original discharge tray for supporting and guiding the originals fed to the original discharge section 18.

An original supply tray 20 having a horizontal length or width substantially equal to that of the original storage section 16 is slidably arranged in the section 16. The tray 20 is movable or slidable between a housed position at which it is housed in the storage section 16, as shown in FIG. 2, and a drawn position at which it is drawn from the casing 1 through the inlet opening 14 by a certain distance, as shown in FIGS. 3 and 4.

A rectangular lid 22 for opening and closing the opening 2 of the casing 1 is swingably attached to that end of the original supply tray 20 which is located on the side of the inlet opening 14 of the casing 1. When the lid 22 is swung so as to extend in a direction perpendicular to the tray 20 while the tray 20 is located at its housed position, the opening 2, that is, the inlet and outlet openings 14 and 15 are closed by the lid 22. When the tray 20 is pulled together with the lid 22 out of the casing 1, the lid 22 is swung in a horizontal state.

Figure 4:
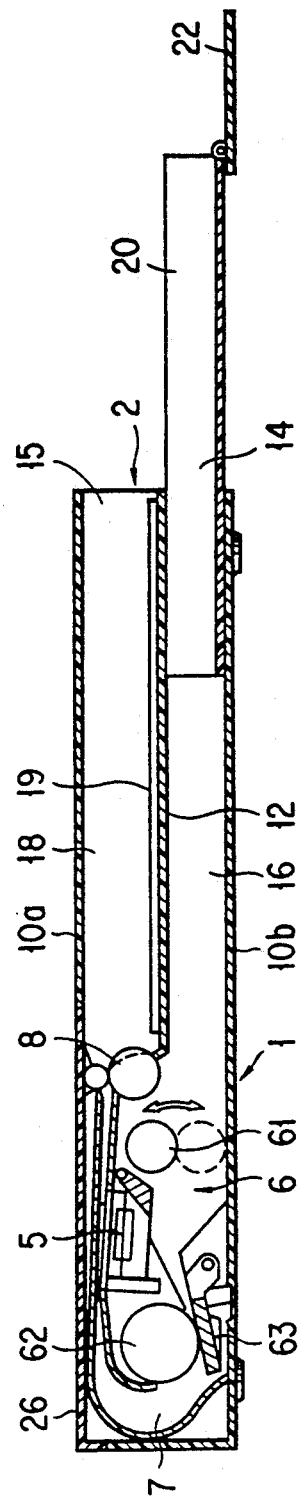
Figure 5:
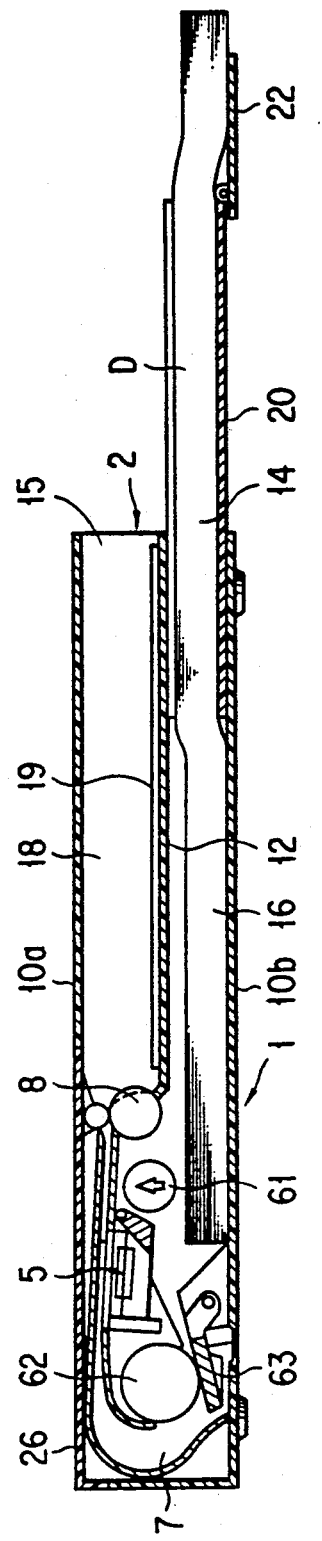

As shown in FIGS. 2 and 4, in the rear portion of the casing 1 are arranged an original reading section 5 for reading images on originals D, an original supply device 6 for feeding the originals D in the original storage section 16 one by one to the reading section 5, a guide 7 for guiding the originals D fed from the supply device 6 to the reading section after turning the originals, and discharge rollers 8 for discharging the originals D which has been read by and passed the original reading section 5 to the original discharging section 18.

The original supply device 6 includes a pickup roller 61 for picking up the original one by one from the top of those originals D which are set in the original storage section 16 through the inlet opening 14, and a supply roller 62 associating with a separating pad 63 to separate a original from the others when plural originals are picked up by the pickup roller 61 while overlapping with one another.

As shown in FIG. 1, an operating section 24 is provided at the right end portion of the front side wall of the casing 1. This operating section 24 includes a start key, a stop key and indicators for indicating the operating state of the apparatus.

The casing 1 has a detachable cover 26 on rear end portion of the top wall 10a. When jam of a original is occurred in the casing 1 or maintenance of the facsimile is performed, for example, the inside of the casing 1 can be exposed by detaching the cover 26.

The operation of the facsimile which has the above-mentioned arrangement will be described.

As shown in FIGS. 3 and 4, first, the lid 22 is opened and the original supply tray 20 is drawn together with the lid 22 from the casing 1.

In this state, a plurality of originals D are inserted into the original storage section 16 in the casing 1 through the inlet opening 14 until front ends of the originals come under the pickup roller 61. Those portions of the originals D which have been inserted into the storage section 16 are mounted on the bottom wall 10b of the casing 1 and on the rear end portion of the original supply tray 20, while those portions of the originals D which are located outside the casing 1 are mounted on the tray 20 and the lid 22. The pickup roller 61 is in contact with the top of the originals D inserted.

When the start key of the operating section 24 is pushed, the pickup roller 61 is rotated to pick up the original one by one from the top of the originals D in the storage section 16 and feed it between the supply roller 62 and the separating pad 63. When two originals are picked up by the pickup roller 61 while being overlapped one upon the other, for example, the lower original is separated by the frictional resistance of the separating pad 63 to allow only the upper one to be fed by the supply roller 62.

The original picked up in this manner by the pickup roller 61 is fed by the rotation of the supply roller 62 and turned upward toward the original reading section 5 by the guide 7. An image on the original D is scanned at the reading section 5 and signals thus obtained are sent to a control section (not shown).

Figure 6:
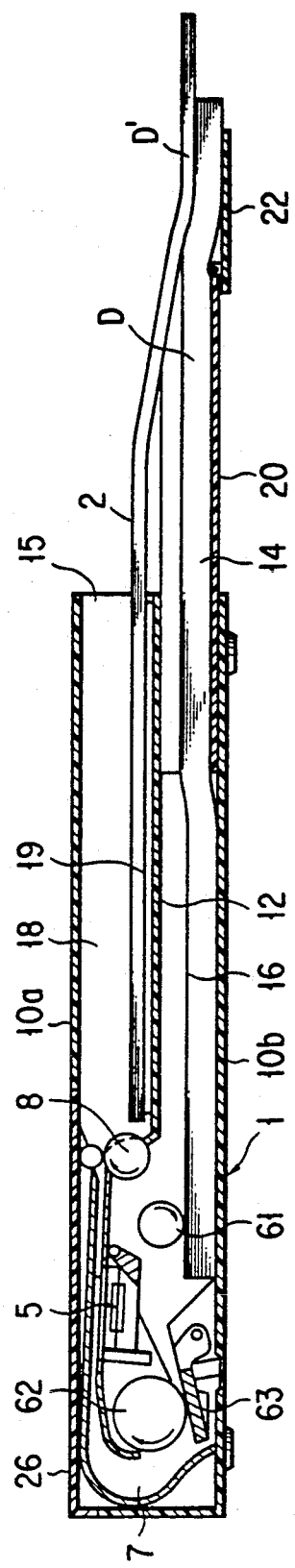

The original D' which has been read at the reading section 5 is discharged into the original discharge section 18 by the discharge roller 8, as shown in FIG. 6. Rear halves of the originals D' thus discharged are mounted on the partition plate 12, while front halves thereof are introduced outside the casing 1 through the outlet opening 15 and mounted on the un-read originals D which have been set in the originals storage section but left outside the casing 1.

Figure 7:
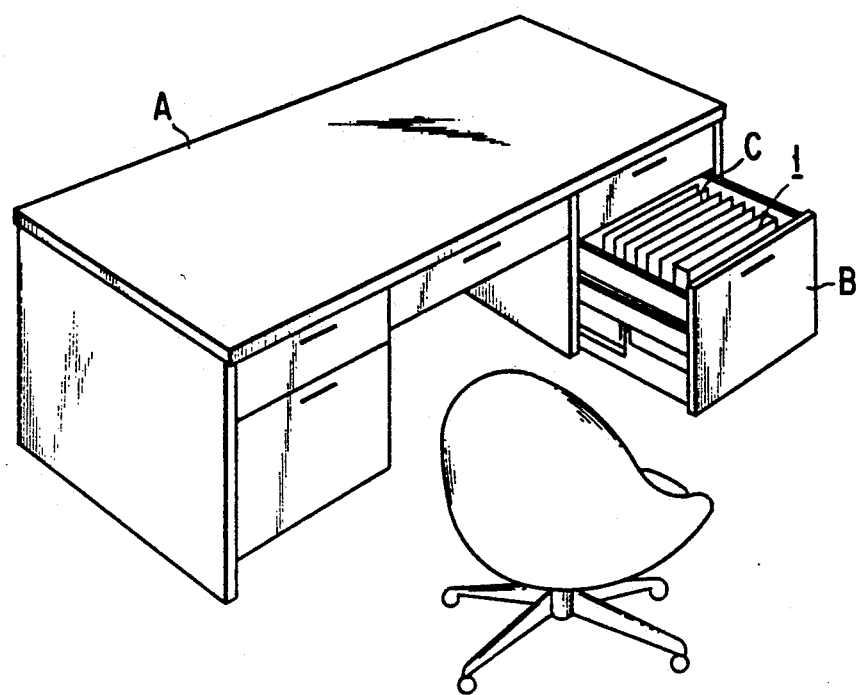
FIG. 7 is a perspective view showing a state wherein the apparatus is housed in a drawer of a desk.
Figure 8:
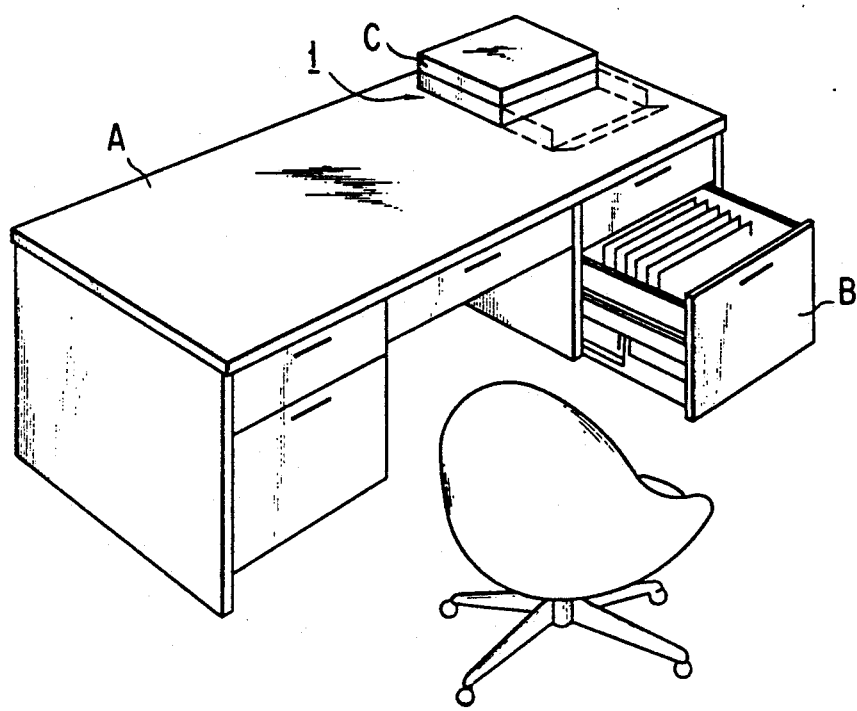
FIG. 8 is a perspective view showing a state wherein the apparatus is placed on a desk.
Figure 9:
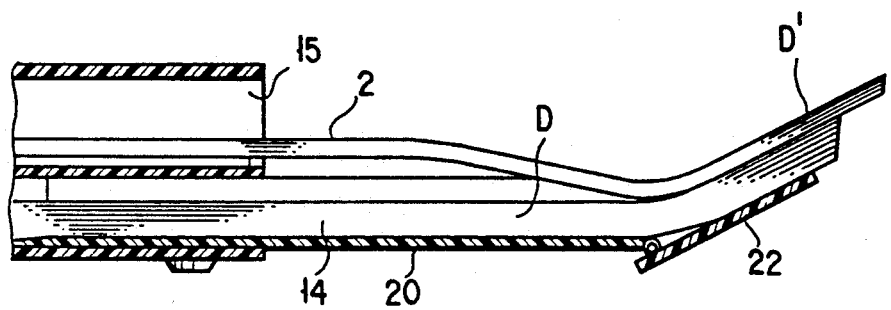
FIG. 9 is a sectional view showing a part of original supply tray according to a modification of the present invention.

When the facsimile is not used, the original supply tray 20 is pushed into the casing 1 and the opening 2 of the casing 1 is closed by the lid 22. In this state, the whole of the facsimile is in a flat rectangle shape. As shown in FIG. 7, therefore, the facsimile can be housed together with document files C in a drawer B of a desk A. While the facsimile is placed on the desk A, for example, document files C can be mounted on the top of the casing 1, as shown in FIG. 8.

According to the facsimile having the above-described arrangement, the originals can be inserted into the casing through the inlet opening 14 which is formed at one side wall or front side wall of the casing, and discharged outside the casing through the outlet opening 15 which is formed at the same side wall or front side of the casing after images of the originals are read by the reading means 5 in the casing. Since the inlet and outlet openings for the originals are formed in the same side wall of the casing in this manner, the whole of the facsimile can be made more compact and the space needed for setting the facsimile can be minimized, as compared with the conventional ones each having the inlet and outlet openings for the originals formed at those two sides of the casing which are opposed to each other. Further, the facsimile of the present embodiment can be made thinner and more compact because it needs no such original supply tray that extends obliquely and upward from the casing as in the conventional cases. Since the facsimile is thin and compact in size as a book, it can be housed together with document files in the drawer of a desk, for example, and document files can be placed on the casing the facsimile. Further, the facsimile can be easily carried by hand.

It should be understood that the present invention is not limited to the above-mentioned embodiment and various changes and modifications can be made without departing from the scope of the present invention.

For example, the present invention can be applied to other reading apparatuses as well as the facsimile. In addition, the inlet and outlet openings for the originals can be formed not only in the front side wall of the casing but also at one lateral side or rear side wall thereof.

As shown in FIG. 7, during the operation of the facsimile, the lid 22 of the supply tray 20 may be kept in a position inclined to the horizontal plane. In this case, the discharged originals D' can be prevented from falling from the supply tray 20.

What is claimed is:

1. An apparatus for reading an image on an original, comprising:

a substantially rectangular casing having a side wall, an original inlet opening through which the original is inserted into the casing, an original outlet opening through which the original is introduced outside the casing, the original inlet and outlet openings are formed in the side wall and wherein the original outlet opening is located above the original inlet opening;

means for feeding the original which is inserted into the casing through the inlet opening to the outlet opening;

means for reading the image on the original fed by the feeding means; and wherein the casing includes a bottom wall, a top wall parallel to the bottom wall, a partition plate extending between the bottom and top wall in parallel to the bottom wall, an original storage section defined between the bottom wall and the partition plate and communicating with the original inlet opening to receive the originals inserted into the casing through the inlet opening, and an original discharge section defined between the top wall and the partition plate and communicating with the discharge outlet to receive the originals passed through the reading means.

2. An apparatus according to claim 1, wherein the casing includes another side wall opposing said side wall, and the reading means is located between the another side wall and the original discharge section.

3. An apparatus according to claim 2, wherein the feeding means includes means for picking up the originals received in the original storage section one by one and feeding the original toward the another side wall of the casing, guide means for guiding the original fed from the picking up means to the reading means while turning the original toward the side wall with the inlet and outlet openings, and means for discharging the original passed through the reading means to the original discharge section.

4. An apparatus according to claim 1, which further comprises an original supply tray fitted to the casing and movable between a housed position where the supply tray is housed in the original storage section and a drawn position where the supply tray is drawn outside form the casing through the original inlet opening, for supporting those portions of the originals inserted into the original storage section which project outside the casing, when the supply tray is in the drawn position.

5. An apparatus according to claim 4, which further comprises a lid swingably attached to the original supply tray, for opening and closing the inlet and outlet opening of the casing when the supply tray is in the housed position.

6. An apparatus for reading an image of an original, comprising:

a substantially rectangular casing including front and rear side walls, inlet and outlet openings formed in the front side wall, first storage means for storing originals inserted into the casing through the inlet opening while parts of the originals project outside the casing, and second storage means located above the first storage means, for storing originals while parts of the originals project outside the casing through the outlet opening;

means arranged in the casing and adjacent to the rear side wall, for reading the image on the original;

means for feeding the originals stored in the first storage means one by one toward the rear side wall of the casing;

means for turning the original fed by the feeding means and guiding the original thus turned to the reading means;

means for discharging the original passed through the reading means to the second storage means; and means for supporting those portions of the originals stored in the first and second storage means which project outside the casing.

* * * * *